Aug. 11, 1964   P. GOLDMAN   3,144,211
WATER SWEEPER ATTACHMENT FOR GARDEN HOSE
Filed Aug. 6, 1962

INVENTOR.
PERCY GOLDMAN
BY Blum, Moscovitz,
Friedman & Blum
ATTORNEYS

United States Patent Office 3,144,211
Patented Aug. 11, 1964

3,144,211
WATER SWEEPER ATTACHMENT FOR GARDEN HOSE
Percy Goldman, 411 E. 57th St., New York, N.Y.
Filed Aug. 6, 1962, Ser. No. 215,022
3 Claims. (Cl. 239—532)

This invention relates to water sweeping attachments for a garden hose and, more particularly, to a novel, inexpensive, lightweight and rugged water sweeper attachment having novel features providing a more efficient sweeping action.

Various attachments have been provided for use with a garden hose so that the latter may be used for special purposes, these attachments usually being in the form of special nozzles and the like. Among such attachments are attachments for cleaning cars, spray attachments, shower attachments and, rather lately, water sweeper attachments for flushing a sidewalk or the like. However, known water sweeper attachments are characterized by a relatively heavy metal construction, are relatively expensive, and are subject to relatively high maintenance and repair expenses.

In accordance with the present invention, these disadvantages of prior art water sweeping attachments for a garden hose are obviated by providing a water sweeper attachment which is constructed of plastic material, and which is designed for easy, rapid and inexpensive assembly and also to provide an improved spraying action for water sweeping purposes. To this end, the water sweeper of the present invention comprises a relatively elongated tube of relatively stiff plastic composition material which includes a relatively elongated rectilinear central section and relatively shorter end sections bent in opposite directions from said end sections, one of these end sections constituting a handle section and the other a deflector section.

This handle section has secured thereto, in a novel manner, a female hose coupling which is rotatable on the handle section and which may be disengageably connected to the male coupling of a garden hose. Novel means are provided for restraining or limiting axial movement of the female coupling relative to the handle section. On the other end of the relatively elongated tube, there is integrally secured a deflector of novel construction which provides an improved water stream for sweeping purposes.

The arrangement is light in weight, has a long and substantially indefinite life, and is inexpensive to manufacture and assemble, whereby it may be sold at a relatively low price.

For an understanding of the principles of the invention, reference is made to the following description of a typical embodiment thereof as illustrated in the accompanying drawings. In the drawings:

FIG. 2 is a partially exploded perspective view of the handle end of the water sweeper;

Figure 1:
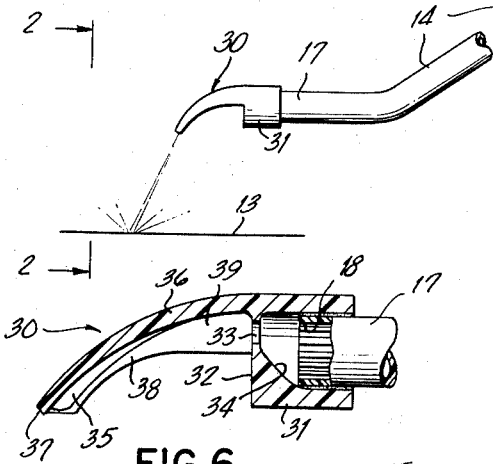
FIG. 1 is a side elevational view of a water sweeper attachment secured to the end of a garden hose and illustrated in operating relation.
Figure 2:
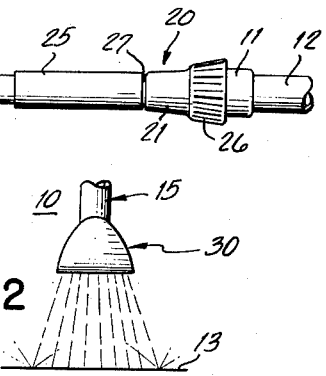
FIG. 2 is a view looking to the right at FIG. 1, as indicated by the arrows 2—2.
Figure 3:
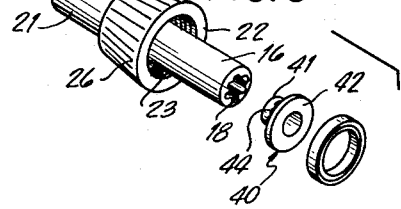

Referring to FIGS. 1, 2 and 3 of the drawings, the water sweeper 10 comprises a relatively elongated tube 15 preferably formed of plastic composition material, such as, for example, polystyrene. On one end of tube 15 there is mounted a female coupling 20 for engagement with a male coupling 11 of a garden hose 12. On the opposite end of tube 20, there is secured a deflector or water spreader 30 arranged to direct water, entering through the coupling 20, as a flat fan shape stream against a sidewalk 13 or the like to sweep the same with water.

The tube 15 includes a relatively elongated and substantially rectilinear intermediate section 14 and a pair of relatively shorter and substantially rectilinear end sections 16 and 17 which are bent in opposite directions from the central section 14. For a purpose to be described, tube 15 may be formed with internal fluting indicated at 18. The end section 16 may be termed the handle section, and the opposite end section 17 may be termed the deflector or deflector mounting section.

The female coupling 20 includes a relatively elongated sleeve portion 21 arranged to have a telescoping fit, with clearance, over the tube 15, and a relatively larger diameter coupling section 22 which is internally threaded as indicated at 23 for threading onto a male hose coupling 11. Sleeve portion 21 merges into coupling portion 22 at a relatively sharp shoulder forming portion 24. The coupling portion 22 may be knurled, as indicated at 26, to provide a firm grip for tightening this coupling portion onto male hose coupling 11.

Female coupling 20 preferably is formed of a relatively flexible and a relatively unbreakable plastic composition material, such as polyethylene, but may be a rigid plastic composition material or may be metal. When the coupling is formed of polyethylene, there is no danger of stripping threads 23, due to flexibility of the material. Thus, if coupling 20 is stepped upon, it will not break but merely bend, and will resume its shape when the pressure is released.

The female coupling 20 is assembled onto the handle section 16 of the tube 15 in the following manner. In advance of placing the female coupling 20 onto the handle section 16, a relatively elongated sleeve 25, of the same material as the tube 15, and which is preferably polystyrene, is telescoped over the handle section 16, having a very close sliding fit therewith. The sleeve 25 is moved far enough inwardly along the handle section 16 so that, when the sleeve portion 21 of the coupling 20 later is telescoped over the handle portion 16, with the shoulder 24 substantially flush with the end of the tube 15, there will be a small clearance 27 left between sleeve 25 and the inner end of the sleeve portion 21 of the coupling 20. The sleeve 25 is then welded or integrally united with the tube 15 by applying, to the interface therebetween, a solvent for polystyrene which, when it sets, in effect makes the sleeve 25 of one-piece construction with the handle section 16, forming a welded joint as indicated at 28.

After this has been effected, the coupling 20 is placed over the end of the handle section 16 so as to have a rotational clearance fit between its sleeve portion 21 and the outer surface of the handle section 16. An annular retainer, generally indicated at 40, is then used to anchor the coupling 20 against axial outward displacement on the handle section 16.

Figure 5:
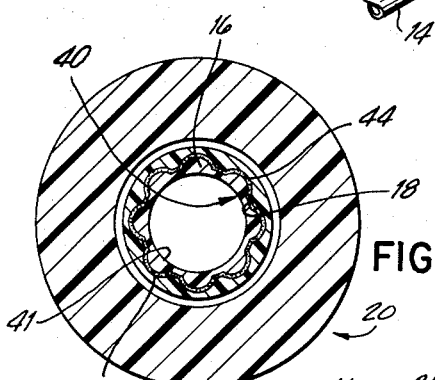
FIG. 5 is a sectional view taken on the line 5—5 of FIG. 4 and looking in the direction of the arrows.
Figure 4:
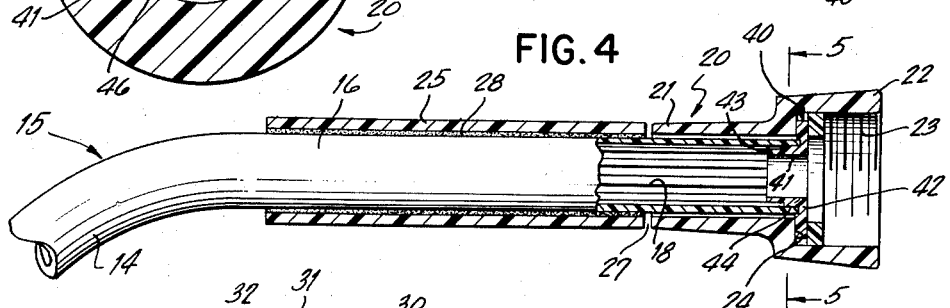
FIG. 4 is a longitudinal sectional view through the handle end of the water sweeper attachment.

As best seen in FIGS. 3, 4 and 5, retainer 40 includes a relatively small diameter annular portion 41 and a relatively larger diameter annular portion 42. The smaller diameter portion 41 provides a nipple arranged to fit within the handle section 16, and the larger diameter portion 42 provides a flange or the like arranged to engage the shoulder 24 of the female coupling 20. In a preferred form of the annular retainer 40, the smaller diameter portion 41 is formed with an even smaller axially inward section 43 and with flutes 44 which are arranged to closely fit the fluting 18 of the tube 15.

The annular retainer 40 is formed of the same material as the tube 15, and this material is preferably polystyrene. Consequently, when the annular retainer 40 has been placed into the outer end of the handle section 16 it may be welded thereto, to form an integral one-piece construction with this handle section, by the application of a suitable solvent for polystyrene, to form a cemented or welded joint as indicated at 46 in FIG. 5. It will be noted that the cemented joint 46 unites the flutes 44 of the retainer 40 to the fluting 18 of the tube 15. However, it should be understood that such interfitting flutes are not necessary and that the interior of the tube 15 may have a smooth cylindrical surface which will have a close fit with a smooth cylindrical surface on the small diameter portion 41 of the retainer 40. When retainer 40 is thus made of one-piece construction with the handle section 16 of tube 15, after coupling 20 has been rotatably assembled on the handle section, it will be noted that the coupling 20 is anchored against axial movement by the flange 42 and the outer end of the sleeve 25, while being permitted to rotate on the handle section 16.

Figure 6:
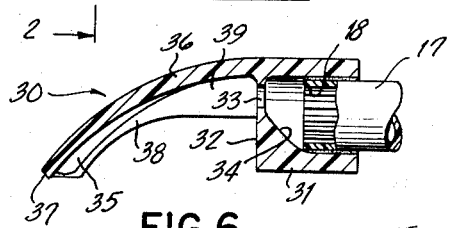
FIG. 6 is a longitudinal sectional view through a deflector forming part of the invention.
Figure 7:
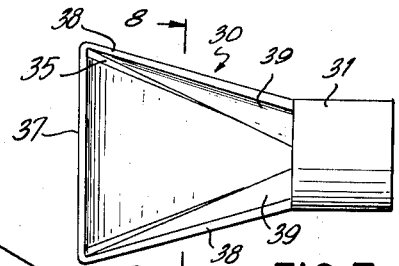
FIG. 7 is an inside elevational view of the deflector.

The deflector 30 also is formed of the same material as the tube 15, which is preferably polystyrene, so that it may be fused or welded thereto to form a one-piece construction therewith. Referring particularly to FIGS. 6 and 7, the retainer 30 includes a generally cylindrical socket portion 31 arranged to have a close telescoping fit over the reflector end 17 of the tube 15. The outer end of socket portion 31 is formed with a transverse partition 32 arranged to engage the outer end of the section 17 of tube 15. This partition 32 is formed with a relatively small diameter and eccentrically located aperture 33 communicating with the tube 15 adjacent the inner periphery thereof, as best seen in FIG. 6. As also best seen in FIG. 6, the partition 33 increases in thickness inwardly of the socket portion 31 to form a streamline flow section by means of which the water flowing through the tube 15 is smoothly directed to the aperture 33.

Figure 8:
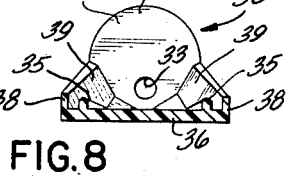
FIG. 8 is a transverse sectional view of the deflector taken on the line 8—8 of FIG. 7 and looking in the direction of the arrows.

A deflector wall 36 is integral with the socket portion 31 and extends outwardly therefrom. Wall 36 is curved longitudinally so as to extend radially inwardly, and the shape of the wall gradually changes from a semicylindrical shape, adjacent the partition 32, to a rectilinear outer or terminal edge 37. As best seen in FIG. 8, the semicylindrical portion is centered transversely relative to the aperture 33. As best seen in FIGS. 7 and 8, the edges of wall 36 diverge axially outwardly from the partition 32 to provide a terminal wall portion which is cylindrical about an axis parallel to a diameter of the socket portion 31. Flanges 38 extend along the side edges of the wall 36.

An important feature of the invention contributing greatly to the provision of a properly directed jet or sweeping stream is the formation of a pair of ribs 35 on the inner surface of the wall 37. These ribs extend along a pair of lines which intersect substantially at the aperture 33 and which terminate at the ends of the edge 37. However, the ribs 35 do not extend to the aperture 33 but terminate short thereof at a common transverse line across the wall 37. It will be noted that there are transitional surface portions 39 which extend outwardly from the center portion of the wall 36 to the flanges 38 and thus form a surface for directing water to flow smoothly along the inner surface of the wall 36. The deflector 30 is secured to the section 17 of tube 15 by applying to the tube and to the deflector a solvent for polystyrene which forms a weld between the deflector and the tube making these two parts an integral one-piece construction.

From the foregoing description, it will be apparent that a novel inexpensive water sweeper has been provided in which a hose coupling is locked against axial displacement, while still being rotatable, in a novel manner, and in which the other parts of the water sweeper are an integral one-piece construction due to the particular selective use of different plastic composition materials. The sweeper is simple to manufacture and assemble, whereby it may be produced and sold at a relatively low cost.

While a specific embodiment of the invention has been shown and described in detail to illustrate the application of the principles of the invention, it will be understood that the invention may be embodied otherwise without departing from such principles.

What is claimed is:

1. In a water sweeper attachment, for a garden hose or the like, of the type including a relatively elongated substantially circular cross section tube of relatively rigid material having a handle end and a discharge end, a female coupling on said handle end effective to couple said tube to the male coupling of a garden hose, and a water deflector and spreader secured to and extending in communicating relation from said discharge end and arranged to discharge water in a substantially flat sheet; the improvement comprising said deflector comprising a generally cylindrical socket portion arranged to have a close telescoping fit over the discharge end of said tube, and having a transverse partition engaging the outer end surface of said discharge end, the partition having a relatively small diameter and eccentrically located aperture communicating with said tube adjacent the inner cylindrical surface thereof; said deflector further comprising a wall integral with and extending axially outwardly from said partition and curved longitudinally to extend radially inwardly, the inner end of said wall being substantially semi-circular and substantially centered transversely relative to said aperture, with the inner surface of said wall being substantially tangent to said aperture, and the edges of said wall diverging axially outwardly from said partition.

2. A water sweeper attachment, the improvement as claimed in claim 1, said wall having flanges along said terminal wall portion; a pair of ribs on the inner surface of said wall and extending along a pair of lines which intersect in said aperture and diverge outwardly from said partition to the axially spaced end sections of the rectilinear outer edge of said terminal wall portion, said ribs having their inner ends terminating at equal distances from said partition; the area of the inner surface of said wall enclosed between said lines being flat transversely of said wall; and sloping transition surfaces connecting said lines to the inner edges of said flanges.

3. A water sweeper attachment, as claimed in claim 1, in which the material of said deflector is polystyrene and is the same as the material of said tube, and said deflector and said tube are integrally welded together.

References Cited in the file of this patent

UNITED STATES PATENTS

| 238,295 | Killam | Mar. 1, 1881 |
|---|---|---|
| 242,871 | Bradish | June 14, 1881 |
| 1,705,188 | Kelly | Mar. 12, 1929 |
| 2,065,549 | Balensiefer | Dec. 29, 1936 |
| 2,289,889 | Stick et al. | July 14, 1942 |
| 2,545,930 | Richardson | Mar. 20, 1951 |
| 2,586,145 | Breuer et al. | Feb. 19, 1952 |
| 2,631,049 | McGillis et al. | Mar. 10, 1953 |
| 2,655,408 | Williams | Oct. 13, 1953 |
| 2,921,488 | Davis | Jan. 19, 1960 |